Figure 1:
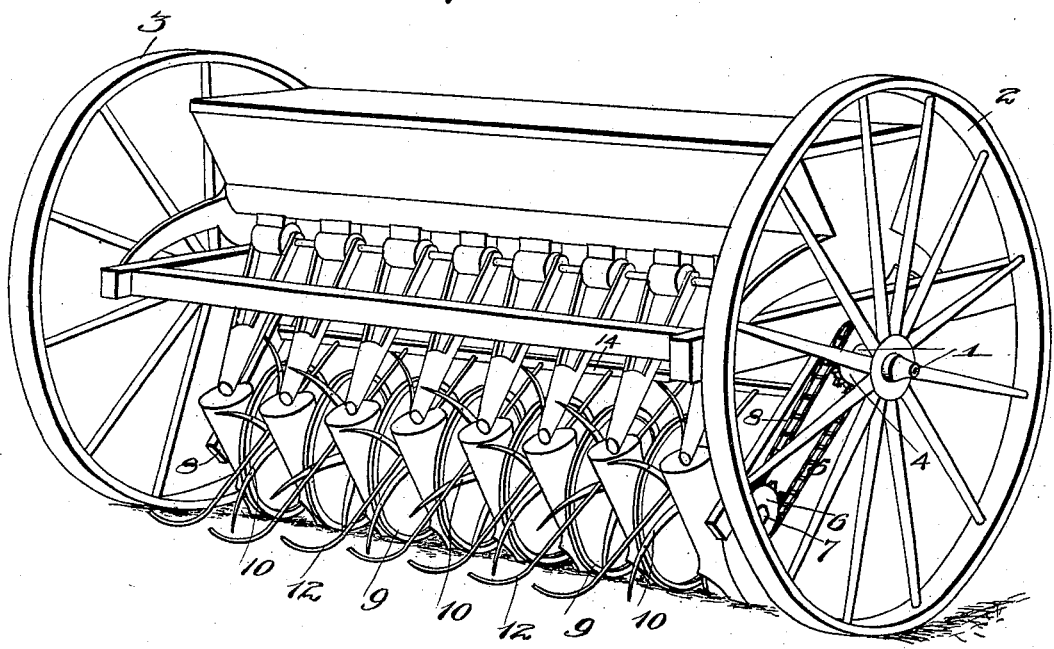

No. 617,454. Patented Jan. 10, 1899.
W. P. WHITTIER.
ATTACHMENT FOR SEED DRILLS.
(Application filed Nov. 5, 1898.)

(No Model.)

Inventor
Winfred P. Whittier,
by
Attorneys

Witnesses

UNITED STATES PATENT OFFICE.

WINFRED P. WHITTIER, OF CONSTANTIS, OHIO.

ATTACHMENT FOR SEED-DRILLS.

SPECIFICATION forming part of Letters Patent No. 617,454, dated January 10, 1899.

Application filed November 5, 1898. Serial No. 695,584. (No model.)

*To all whom it may concern:*

Be it known that I, WINFRED P. WHITTIER, a citizen of the United States, residing at Constantis, in the county of Delaware and State of Ohio, have invented certain new and useful Improvements in Attachments for Seed-Drills; and I do declare the following to be a full, clear, and exact description of the invention, such as will enable others skilled in the art to which it appertains to make and use the same.

My invention relates to attachments for seed-drills; and the object is to provide a simple and effective device for clearing away the weeds from the drills while the seed is being planted.

To this end the invention consists in the construction, combination, and arrangement of the device, as will be hereinafter more fully described, and particularly pointed out in the claim.

The same reference characters indicate the same parts of the invention in the accompanying drawings.

Figure 2:
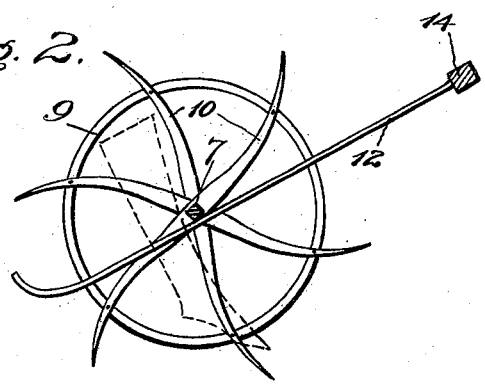

Figure 1 is a perspective view of the rear end of a seed-drill, showing my improved weeding attachment in position. Fig. 2 is a detail view of one of the drill-tubes and cleaner.

1 denotes the axle, and 2 and 3 the carrying-wheels, the former of which is provided with a sprocket-wheel 4, from which a sprocket-chain 5 extends to a similar sprocket-wheel 6, fixed on a transverse rectangular shaft 7, journaled in the side bars 8 8, the forward ends of which are pivotally attached to the frame of the drill.

9 9 denote a series of wheel-rims fixed to a series of spoke-teeth 10 10, which in turn are fixed to the shaft 7, so as to revolve with it. One wheel is mounted on the shaft between each pair of seed-hoes.

12 12 denote a series of curved rods, which are secured at their forward ends in a cross-brace 14, connecting the side bars 8 8.

The rake or spoke teeth are suspended so as to touch the ground, and as the cleaner revolves the teeth prevent the weeds and trash from collecting in front of the drill-hoes by drawing the trash behind and discharging it behind the drills, the teeth passing alongside of the curved ends of the rods 12, which clear the teeth of any adhering trash or rubbish.

The accompanying drawings show my invention in the best form now known to me; but many changes in the details might be made within the skill of a good mechanic without departing from the principle or sacrificing any of the advantages of the invention.

Having thus described my invention, what I claim, and desire to secure by Letters Patent, is—

In combination, a seed-drill, its axle, and the ground-wheels 2 and 3, one of which is provided with the sprocket-wheel 4, the bars 8 8 connected by the cross-brace 14 and pivoted at their forward ends to the drill-frame, the rectangular shaft 7 journaled in said bars, the sprocket-wheel 6 fixed on said shaft, the sprocket-chain connecting said sprocket-wheels, the curved rake-teeth 10 radially fixed on said shaft 7, the concentric rims 9 fixed to said rake-teeth, and the curved rods 12 fixed in said cross-brace and having their rear ends extending contiguous to and parallel with said rake-teeth, substantially as shown and described.

In testimony whereof I have hereunto set my hand in presence of two subscribing witnesses.

WINFRED P. WHITTIER.

Witnesses:
F. B. LEWIS,
C. H. WHITMAN.